(12) United States Patent
Zimmer

(10) Patent No.: US 6,640,381 B1
(45) Date of Patent: Nov. 4, 2003

(54) WIPER ARM FOR A VEHICLE

(75) Inventor: Joachim Zimmer, Sasbach (DE)

(73) Assignee: Robert Bosch GmbH, Stuttgart (DE)

( * ) Notice: Subject to any disclaimer, the term of this patent is extended or adjusted under 35 U.S.C. 154(b) by 211 days.

(21) Appl. No.: 09/695,939

(22) Filed: Oct. 25, 2000

(30) Foreign Application Priority Data

Oct. 25, 1999 (DE) ......................... 199 51 440

(51) Int. Cl.[7] .............. B60S 1/32; B60S 1/34
(52) U.S. Cl. ................ 15/250.352; 15/250.351
(58) Field of Search .............. 15/250.351, 250.352, 15/250.34, 250.202, 250.19

(56) References Cited

U.S. PATENT DOCUMENTS

| | | | | |
|---|---|---|---|---|
| 2,226,358 A | * | 12/1940 | Sibley | 15/250.352 |
| 2,975,457 A | * | 3/1961 | Scinta | 15/250.352 |
| 3,422,484 A | * | 1/1969 | Carpenter | 15/250.352 |
| 3,548,442 A | * | 12/1970 | Stratton | 15/250.352 |
| 4,170,804 A | * | 10/1979 | Scotcher | 15/250.352 |

FOREIGN PATENT DOCUMENTS

| | | | | |
|---|---|---|---|---|
| EP | 0575241 | * | 12/1993 | 15/250.352 |
| EP | 0755833 | * | 1/1997 | 15/250.352 |
| EP | 0770525 | * | 5/1997 | 15/250.352 |
| JP | 61-238547 | * | 10/1986 | 15/250.352 |
| JP | 5-213159 | * | 8/1993 | 15/250.352 |

* cited by examiner

Primary Examiner—Gary K. Graham
(74) Attorney, Agent, or Firm—Michael J. Striker

(57) ABSTRACT

A wiper arm for a vehicle has an arm part, a mounting part, a hinge which hingedly connect the arm part with the mounting part, an abutment arranged so that a relative turning movement of the arm part and the mounting part via the hinge unit is limited by the abutment, the abutment including two spaced abutments and an abutment element which is bringable in operative contact with the two abutments during the turning movement of a respective one of the parts, the abutments being formed of one piece with one of the parts and the abutment element being formed of one piece with another of the parts.

13 Claims, 5 Drawing Sheets

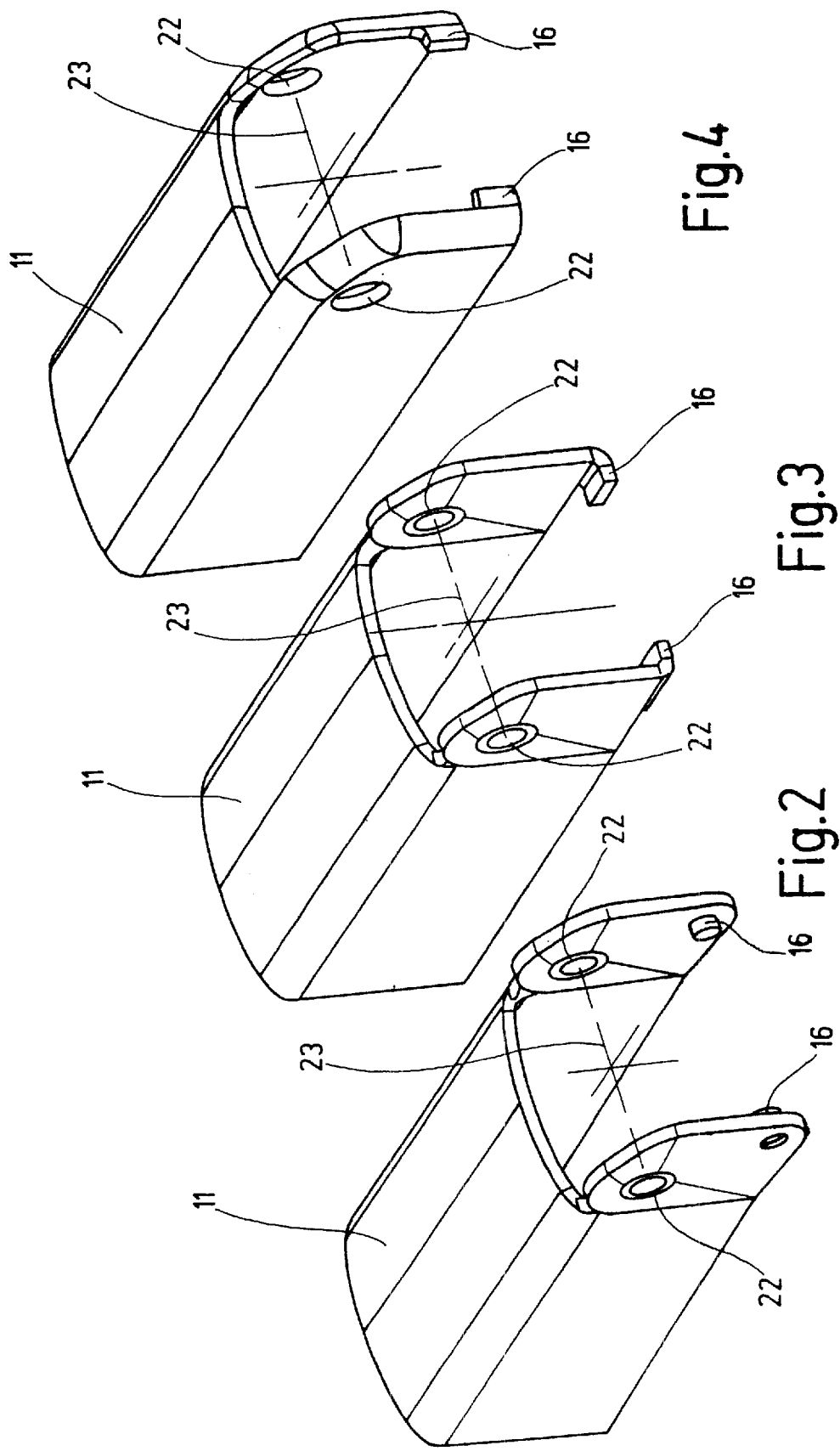

WIPER ARM FOR A VEHICLE

BACKGROUND OF THE INVENTION

The present invention relates to a wiper arm for a vehicle.

More particularly, it relates to a wiper arm which includes an arm part and a mounting part which are connected articulately by a hinge with one another, so that a relative turning movement of the arm part and the mounting part is limited by an abutment.

Wiper arms for vehicles are known, whose mounting on the vehicle is complicated, since additional mounting auxiliary means are needed for correct mounting, to hold the wiper arm in a predetermined mounting position. This mounting auxiliary means must be removed after the mounting of the wiper arm on the vehicle, since they are not needed for a correct operation of the wiper arm, but instead represents an obstacle. Furthermore, this is disadvantageous since it is possible that the mounting auxiliary means which are not correctly mounted and operate for mounting can cause delayed or undesired damages to the wiper arm and/or vehicle (vehicle window) by mounting auxiliary part which is unexpectedly lost from the wiper arm. After the mounting and fixing the mounting auxiliary means, the arm part of the wiper arm is turnable from an operational position into a turned down position, in which the arm part projects approximately perpendicularly outwardly from the vehicle and in particular from a vehicle window.

SUMMARY OF THE INVENTION

Accordingly, it is an object of present invention to provide a wiper arm which avoids the disadvantages of the prior art.

In keeping with these objects and with others which will become apparent hereinafter, one feature of present invention resides, briefly stated, in a wiper arm for a vehicle, in which the abutment means is composed of two abutments which are spaced from one another and an abutment element, which is bringable into an operative contact with the abutments upon a corresponding turning movement of the arm part and/or the mounting part, wherein the abutment is formed of one piece with one of the parts, while the abutment element is formed of one piece with the other part.

Because of the one-piece structure of the two abutments and the abutment element of the corresponding part (arm part, mounting part) of the wiper arm, it is prevented that for positioning of the wiper arm in a stable mounting position. Additional, releasable mounting auxiliary means must be used which are removable after the mounting of the wiper arm on the vehicle. Thereby a simple, fast and reliable mounting of the wiper arm on a vehicle is guaranteed.

Due to the presence of the two spaced abutments, it is further possible to fix a definite turning region of the arm part relative to the mounting part of the wiper arm from a mounting position to a turned down position. Thereby both the mounting position and also the turned down position of the arm part, because of the operational contact of the abutment element with the corresponding abutment, represent a stable end position of the turnable arm part of the wiper arm. With the thusly fixed turning limits of the wiper arm, a correct mounting of the wiper arm (mounting position) and a reliable wiper blade exchange (turned down position) on the vehicle are possible. A mounting of a mounting auxiliary means (additional part) after the wiper arm manufacture and a dismounting of the mounting auxiliary means after the wiper arm mounting on the vehicle are dispensed with. It is also advantageous to provide two turning limits in two opposite turning directions of the arm part with a single abutment element.

In accordance with an advantageous embodiment of the invention, the abutment means is arranged inside a hinge overlapping region of the hinge means. For this purpose, on the one hand a compact construction of the hinge means is provided, and on the other hand, an outwardly actuatable and/or visible geometric design of the hinge means is possible.

In accordance with another advantageous embodiment of the present invention, the turning movement of the arm part and/or mounting part between a mounting position and a turned down position of the wiper arm is performed. For this purpose the mounting position serves a simple and correct mounting of the wiper arm on the vehicle, while the turned down position represents a wiper blade exchange position of the wiper arm. The arm part of the wiper arm is thereby turnable from a defined, stable mounting position against an elastic restoring force (for example of a spring element formed as a pulling spring between the arm part and the mounting part) to a defined, stable turned down position and again back to the mounting position.

An equilibrium position of the wiper arm is advantageously located between the mounting position and the turned down position. In the equilibrium position, an instable position of the arm part relative to the mounting part takes place. The arm part in the equilibrium position is loaded with an elastic restoring force of a spring element provided in the hinge means (pulling spring). Since the turned down position during turning of the arm part from the mounting position is located behind the equilibrium position of the wiper arm as considered from the mounting position, the restoring force of the spring element acts in the turned down position, in which the abutment element is in operative contact with the corresponding abutment, and also in the mounting position acts stabilizingly on the arm part.

In accordance with another advantageous feature of the present invention, the operational position of the wiper arm is located between the mounting position and the equilibrium position. Since in the mounting position the abutment element is in the operative contact with the corresponding abutment, it is advantageous that the operative position of the arm part is spaced from the mounting position, so that the wiper arm in the operative position can turn in two opposite turning directions during the operation which are perpendicular to the vehicle window. Thereby the wiper blade arranged intermediately abuts under action of an optionally adjustable pressing force of the spring element (pulling spring) reliably on the window surface of the vehicle, independently from the corresponding contour of the window surface.

In accordance with a preferable embodiment, the abutment element is formed on the arm part which is arranged in the hinge overlapping region outwardly with respect to the mounting part. Since the abutment element is formed on the arm part which simultaneously acts as an outer hinge part, it is possible to no longer influence the abutment means from outside and make it completely invisible. This also provides a protection of the abutment part from outer, negatively acting influences, such as for example dirtying and/or damaging of the contact surfaces of the abutment, or the abutment element. It also makes possible an outwardly homogenous and compact design of the hinge overlapping region. Furthermore, with the inwardly located abutment means, the injury danger for example by clamping a fingers between the abutment element and the abutment is substantially reduced.

In accordance with a further embodiment, the abutment element is mounted on the mounting part, which is arranged in the hinge overlapping region outwardly relative to the arm part. In this embodiment, there is an inwardly located abutment part with the above mentioned advantages.

Advantageously, the embodiment means is formed of one piece on the hinge means. With a one-piece construction of the abutment means on the hinge means, the mounting cost for producing the wiper arm are reduced. It is advantageous that the abutment means is arranged on the hinge means at the side which is opposite to the vehicle interior space.

Preferably the abutment means is formed on both sides on the hinge means. By the two-sided construction of the abutment means on the hinge means, a force-symmetrical hinge holding of the arm part on the mounting part is possible. The two abutments which act in the mounting position and in the turned down position at both sides and the abutment element arranged at both sides, provide an additional securing with regard to a correct and precise positioning of the arm part relative to the mounting part.

Advantageously, the abutment element during abutment is formed as a projection which is loaded with bending and extends in the hinge overlapping region into the interior of the wiper arm. With such an abutment element which is loaded for bending, the operative contact between the abutment element and the abutment is obtained by a friction contact of two preferably plane surfaces which come in a flat contact with one another and slide over one another. Thereby the arm part with respect to the mounting part is slightly braked before reaching its corresponding stable end position, by a friction force acting against the corresponding turning direction.

Preferably such an abutment which causes on the abutment element a bending is provided for the mounting position, so that the arm part can automatically turn back from the unstable equilibrium position at high speed to the mounting position, because of the acting relatively high elastic restoring force of the spring element which acts as a pulling spring.

The abutment element for the abutment is advantageously formed as a projection which is loaded with sheering and extends in the hinge overlapping region in the interior of the wiper arm. The abutment element which is loaded with sheering is in operative contact with an end-side surface as seen in the movement direction, with a corresponding abutment. Therefore in this case, there is not only a defined limiting of the turning path such as the turning angle of the arm part by a force-transmitting connection between the abutment element and the abutment, but also a geometrical limiting (frontal abutment) of the turning path, such as the turning angle.

Advantageously, a curvilinear recess is provided between the two abutments. Thereby the construction of a compact and simultaneously robust abutment means is possible, since the curvilinear recess can be adapted to the turning path of the abutment element.

In accordance with a further embodiment, a rectilinear recess is provided between the two abutments. By a suitably formed rectilinear recess, advantageously a material saving in the hinge region and a corresponding weight reduction of the wiper arm is obtained with a guarantee of an average stability.

In accordance with a preferable embodiment the abutment element has a flat abutment surface. With a flat abutment surface of the abutment element, and a correspondingly formed abutment, the pressure or friction forces produced during the operative contact acts advantageously in a relatively great surface region. Thereby the possibility of a not desired plastic deformation of the elements, which are in operative contact in condition of high abutment forces, is reduced.

In accordance with a further embodiment, the abutment element has a curved abutment surface. With a curve, for example cylindrical abutment surface of the abutment element and a flat contact surface of the abutment, the effectively acting abutment surface of the abutment element and the abutment is relatively small. Hereby a cylindrical abutment surface of the abutment element is especially advantageous, since because of the rotation-symmetrical construction of the abutment surface, no special angular adjustments of the arm part relative to the mounting part for producing a correct operative contact between the abutment element and the abutment must be taken into consideration.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 2 is a schematic, perspective view of a hinge region of the arm part in accordance with a first embodiment of the invention;

FIG. 3 is a schematic, perspective view of a hinge part of the inventive arm part in accordance with a second embodiment of the present invention;

FIG. 4 is a schematic, perspective view of a hinge part of the inventive arm part in accordance with a third embodiment of the present invention;

DESCRIPTION OF PREFERRED EMBODIMENTS

Figure 1:
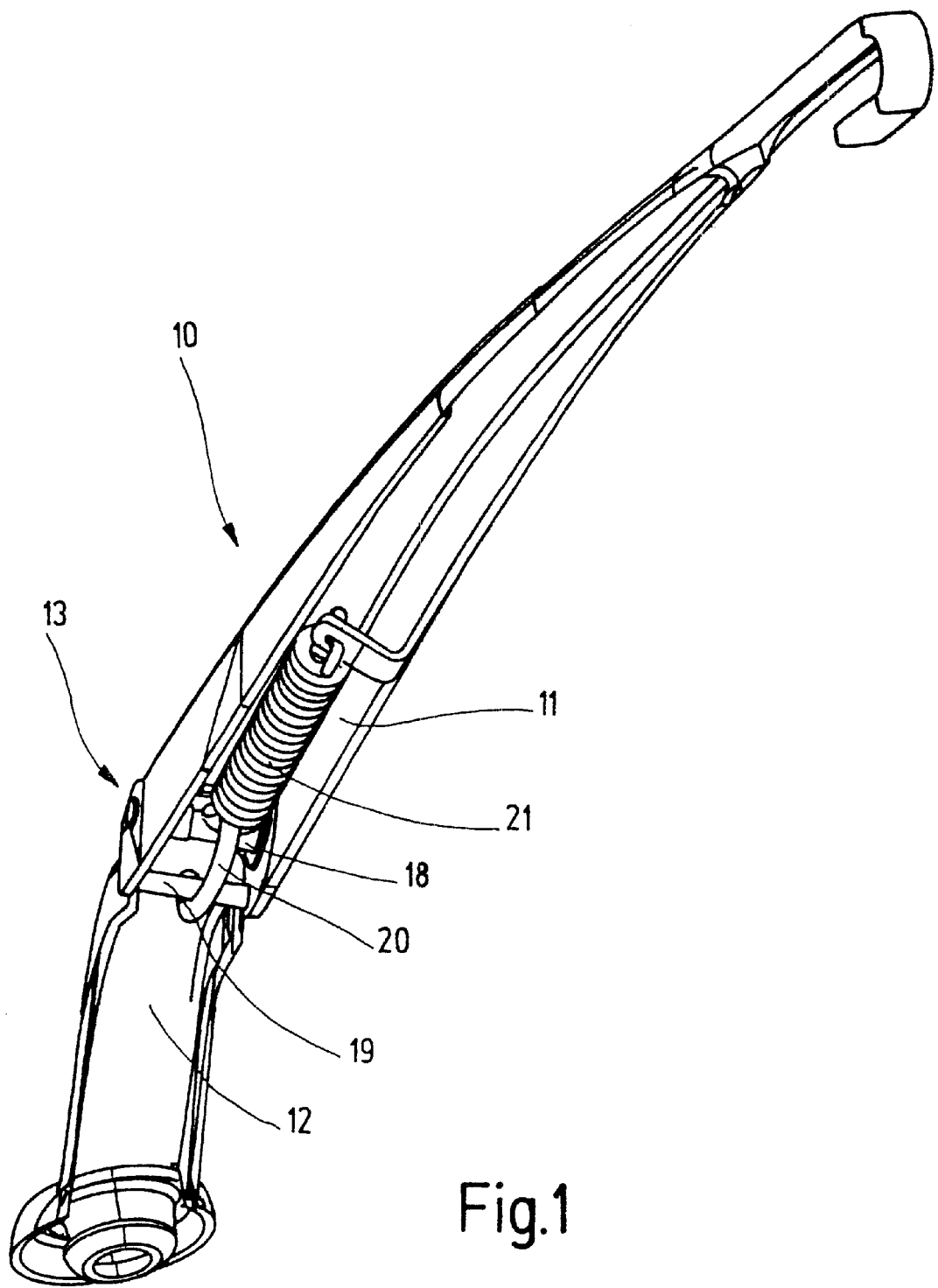
FIG. 1 is a schematic perspective view of a wiper arm in accordance with the present invention.

A wiper arm for a not shown vehicle is identified in FIG. 1 as a whole with reference numeral 1. It has an arm part 11 and a mounting part 12 which are pivotably connected with one another by a hinge means 13. The hinge means 13 has a hinge pin 18 which is supported in two aligned throughgoing openings 22 of the arm part 11 shown in FIGS. 2–4 and in two corresponding coaxial throughgoing openings of the mounting part 12 shown in FIGS. 8–11. The hinge pin 13 is supported so that a turning of the arm part 11 relative to the mounting part 12 or vice versa about a turning axis 23 is possible against an elastic restoring force of a spring element. The spring element is formed as a pulling spring 21. For this purpose a C-bracket 20 is connected by its ends elastically by means of the pulling spring 21 with the arm part 11 and is supported with its another end on a rivet pin 19 of the mounting part 12.

The arm part 11 is provided in the hinge region inside with two abutment elements 16 which are located opposite to one another and in alignment with one another, as shown in FIGS. 2–4. The abutment element 16 together with corresponding two associated and spaced abutments 15, 17 form an abutment means 14 shown in FIGS. 5–7. The abutment means 14 serve for limiting a relative hinge movement (turning movement) of the arm part 11 and the mounting part 12. For this purpose the abutment element 16 comes in operative contact with the two associated abutments 15, 17 during the corresponding hinge movement of the arm part 11 (in the position mounted on the vehicle) and/or the mounting part 12, in non-mounted position.

In correspondence with the embodiment shown in the drawings, the abutment element 16 is formed of one piece with the arm part 11, and two abutments 15, 17 are formed of one piece with the mounting part 12. The abutment means 14 composed of the abutment element 16 and two abutments 15, 17, is arranged inside a hinge overlapping region of the hinge means 13. The arm part 11 is arranged in the hinge overlapping region outwardly with respect to the mounting part 12, as shown in FIG. 1. The abutment element 16 can move in the embodiment of FIGS. 5–6 during a corresponding turning movement of the arm part 11, along a curvilinear recess 24 adjusted to the turning movement of the abutment element 16, from the abutment 15 to the abutment 17. In contrast, as shown in FIG. 7, the recess 24 between the abutments 15 and 17 of the mounting part 12 is formed rectilinearly, whereby during a corresponding turning movement the arm part 11 of the abutment element 16 can move with no problems from the abutment 15 to the abutment 17.

Figure 8:
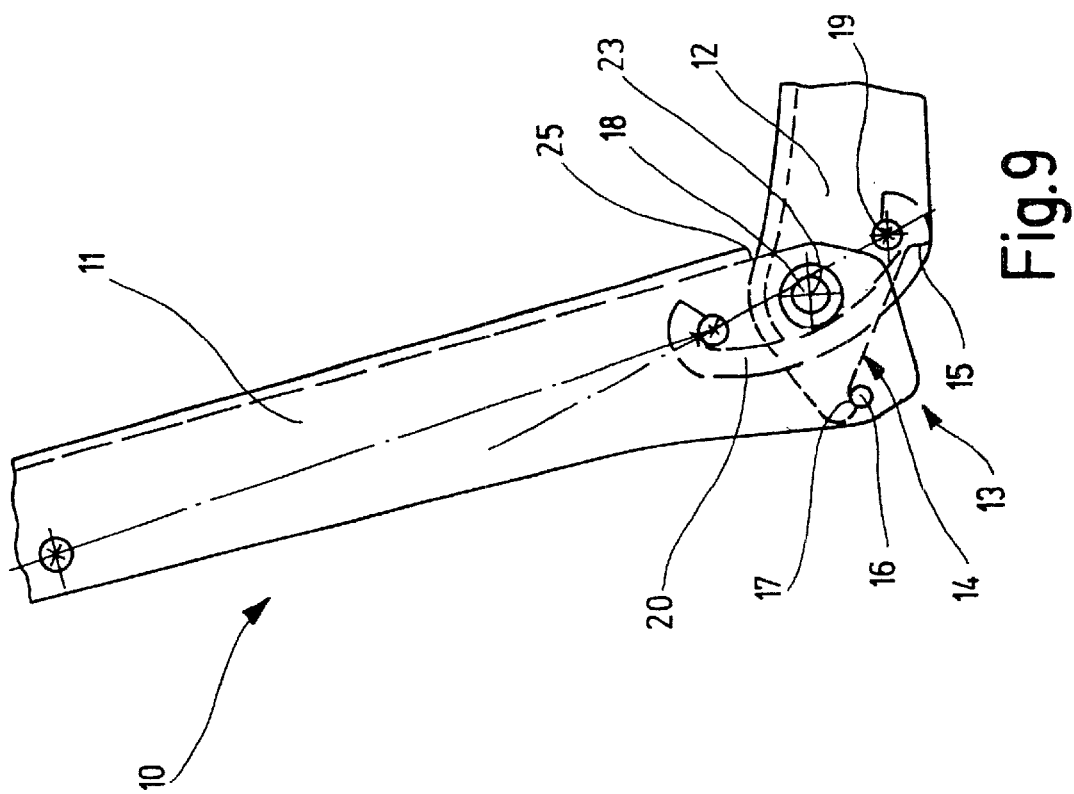
FIG. 8 is a schematic side view of the hinge region of the wiper arm of FIG. 7, in an equilibrium position.

In FIG. 4 the wiper arm 10 is shown in an equilibrium condition, in which the abutment element 16 is not in operative contact with the abutment 17, and the arm part 11 thereby is movable in two opposite turning directions. This equilibrium position of the wiper arm 10 is an instable position. In other words, the arm part 11 can turn because of the acting elastic restoring force of the pulling spring 21 in FIG. 1 under the action of insignificant, outer influence, both in a clockwise direction as shown in FIG. 8 in a turned away position, in which the abutment element 16 is in operative contact with the abutment 17. It can also turn opposite to the clockwise direction in not mounted position to a mounting position in which the abutment element 16 is in operative contact with the abutment 15.

Figure 9:
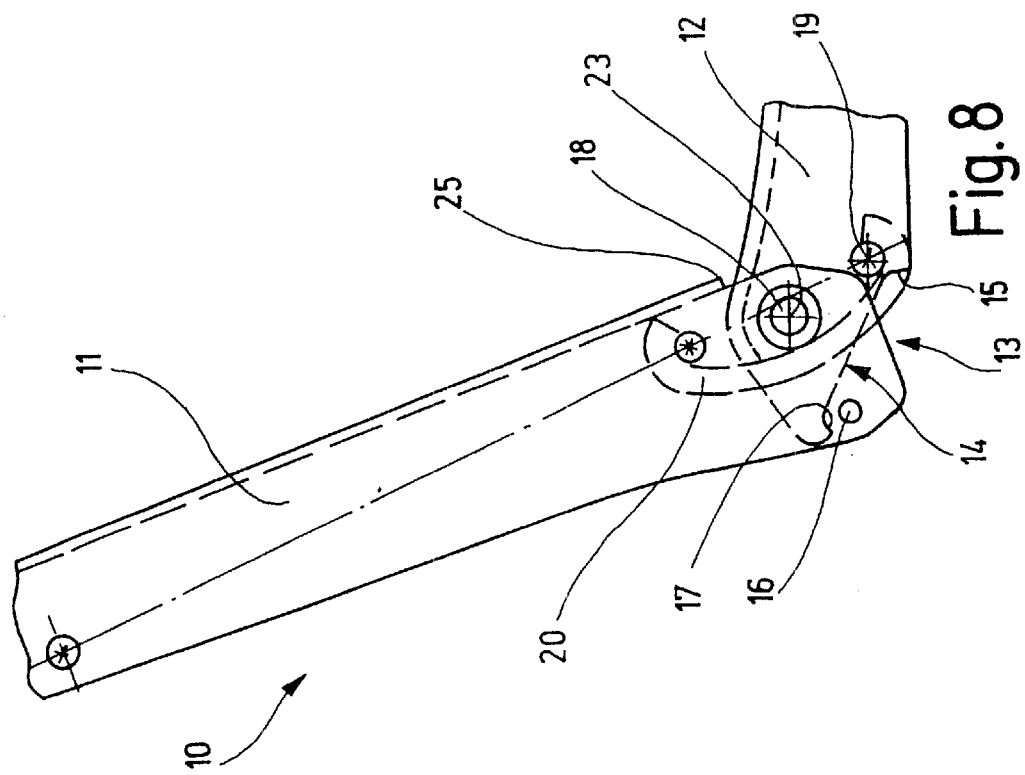
FIG. 9 is a schematic side view of the wiper arm of FIG. 8 in a turned away position.
Figure 11:
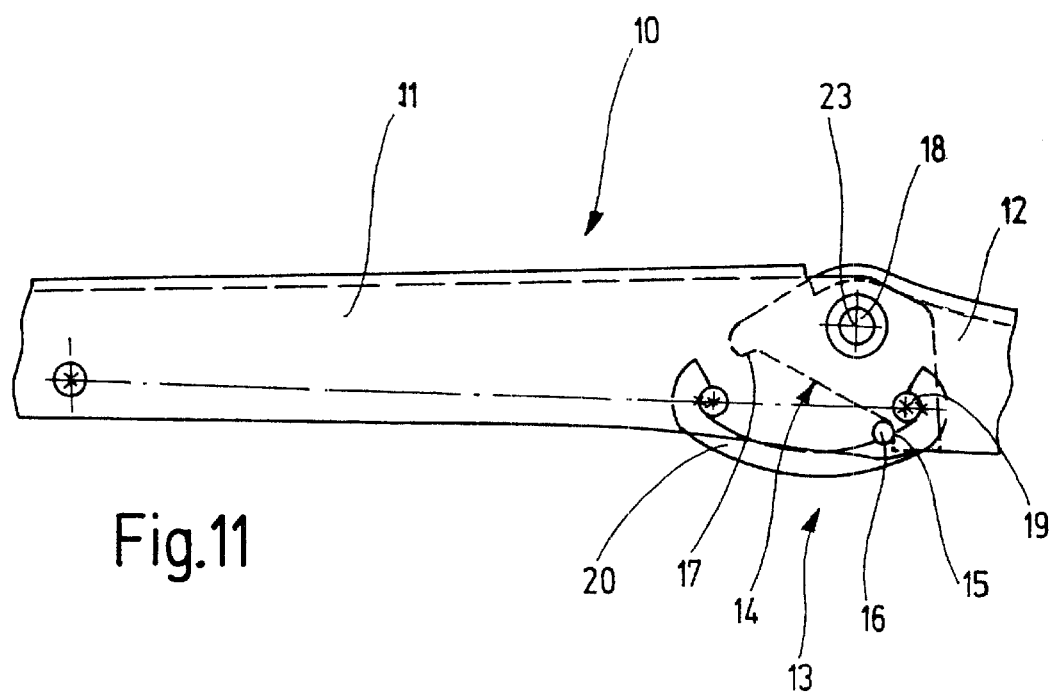
FIG. 11 is a schematic side view of the wiper arm of FIG. 8 in a mounting position.

In FIG. 9 the turned away position of the arm part 11 is shown, while in FIG. 11 the mounting position of the wiper arm 10 is shown. The equilibrium position of the wiper arm 10 shown in FIG. 8 is located with respect to the turning movement of the arm part 11 between the mounting position shown in FIG. 11 and the turned away position shown in FIG. 9. Thereby the mounting position and the turned away position of the wiper arm 10 are stable positions of the arm part 11 relative to the mounting part 12, since the turning movement is limited by the operative contact between the abutment element 16 and the corresponding abutment 15 or 17 and the elastic restoring force of the pulling spring 21 in FIG. 1 is stabilizingly acts on the corresponding end position.

Figure 10:
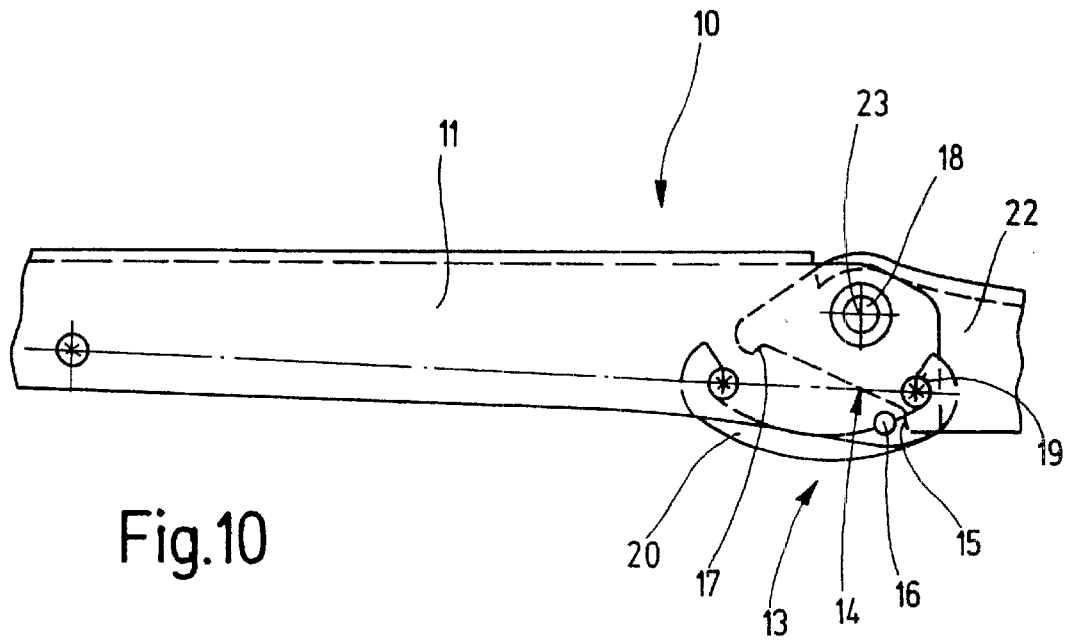
FIG. 10 is a schematic side view of the wiper arm of FIG. 8 in an operative position.

FIG. 10 shows the wiper arm 10 in an operative position, which is located between the mounting position shown in FIG. 11 and the equilibrium position shown in FIG. 8 or the turned down position shown in FIG. 9. In the operative position of the wiper arm 10 in accordance with FIG. 10, the abutment element 16 is not in operative contact with one of the two abutments 15, 17. The operative position corresponds to a position of the arm part 11 when the same abuts with a not shown wiper blade against a vehicle window. In the operative position the arm part 11 is loaded with an elastic restoring force of the pulling spring 21, so that the wiper blade is continuously pressed against the vehicle window. Thereby the arm part 11 in the operative position is turnable in two opposite turning directions perpendicular to the vehicle window.

FIGS. 2–4 show three different embodiments for the manufacture and the geometrical design of the abutment element 16 on the arm part 11. The abutment element 16 of FIG. 2 extends as cylindrical pins in the hinge overlapping region on the legs of the arm part 11 inwardly. Such abutment element 16 can be produced during the manufacture relatively simply by a suitable punching. In FIGS. 3 and 4, the abutment element 16 is formed as tongues which surround the length of the arm part 11 in the hinge overlapping region. FIG. 3 shows a tongue extending inwardly on the corresponding side wall of the arm part 11 which has a U-shaped cross-section. FIG. 4 shows two tongues located at end sides of the arm part 11 which has a U-shaped cross-section. In both embodiments of FIGS. 3 and 4, substantially flat surfaces of the abutment element 16 are in operative contact with the corresponding abutment 15, 17. The tongues can be produced with a relatively simple manufacturing technique by a suitable deformation of a metal sheet. The recesses 24 between the abutments 15, 17 can be produced for example by a suitable metal sheet cutting.

Figure 5:
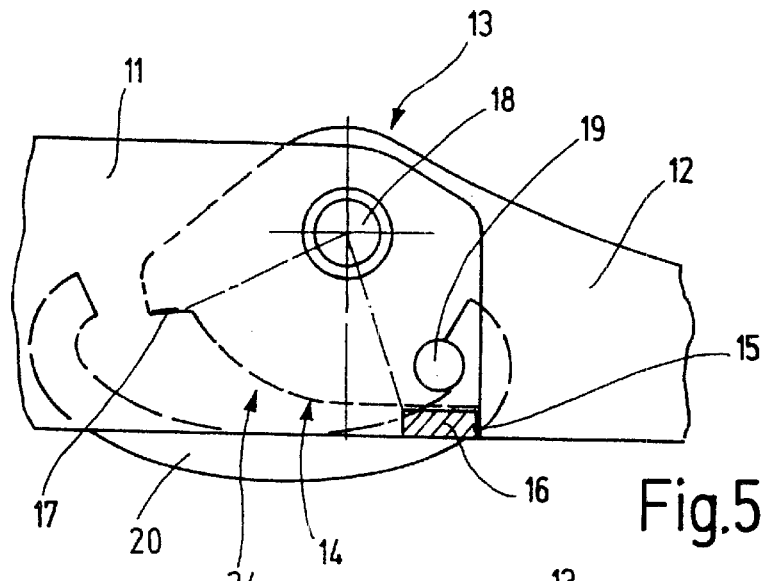
FIG. 5 is a schematic, perspective view of a hinge part of the inventive arm part in accordance with a fourth embodiment of the present invention.

FIG. 5 shows an abutment element 15 formed as a tongue in operative contact with the abutment 15. The wiper arm 10 is located in FIG. 5 in the mounting position. In this embodiment the abutment element 16 in operative contact with the abutment 15, 17 is loaded with sheering.

Figure 6:
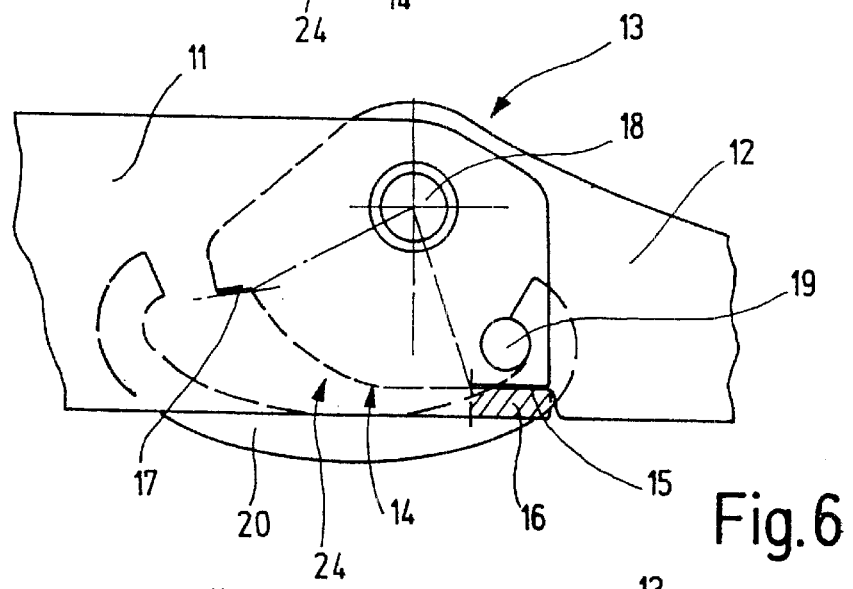
FIG. 6 is a schematic, perspective view of a hinge part of the inventive arm part in accordance with a fifth embodiment of the present invention.
Figure 7:
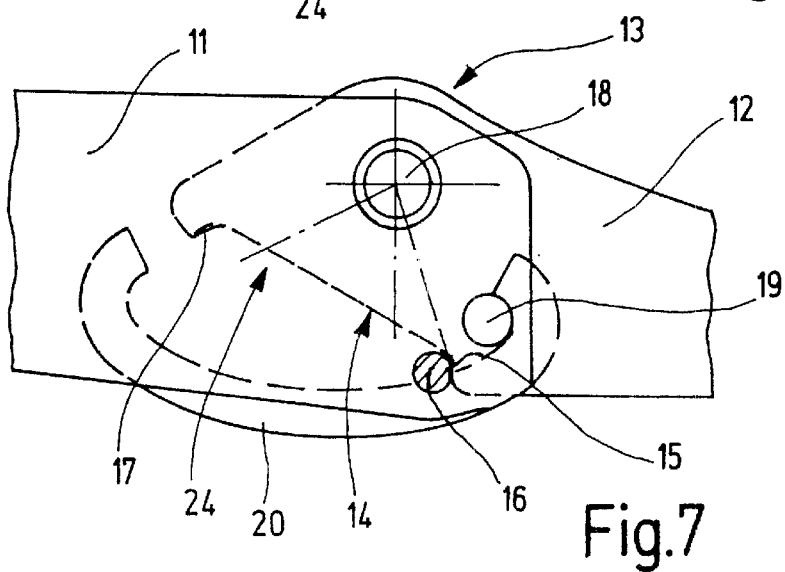
FIG. 7 is a schematic, perspective view of a hinge part of the inventive arm part in accordance with a sixth embodiment of the present invention.

In FIG. 6 the abutment element 16 is also formed as a tongue and located in operative contact with the abutment 15. The operative contact in this embodiment is produced not as in FIG. 5 by an end face which comes in an abutting contact with the abutment 15, but instead by a head surface which comes in a frictional contact with a corresponding abutment surface. Thereby the abutment element 16 shown in FIG. 6 in operative contact with the abutment 15 is loaded with bending. When the arm part 11 is turned from the mounting position shown in FIG. 6 to the turned down position so as to produce an operative contact between a flat end surface of the abutment element 16 and the abutment 17, the abutment element 17 is loaded with sheering as in FIG. 5.

In the embodiment of FIG. 7, the abutment element 16 is formed as a cylindrical pin. During forming of an operative contact with the abutments 15, 17 it is loaded with sheering.

The wiper arm 10 is especially advantageous since for producing a stable mounting position of the wiper arm no additional, releasable mounting auxiliary means are needed. The abutment means 14 allow inside in the hinge overlapping region 14 a turning of the arm part 11 around the turning axis 23 between a mounting position shown in FIG. 11 and a turn down position shown in FIG. 9. The mounting position and the turned down position of the maximum turning region of the arm part 11 are defined with respect to the mounting part 12. Therefore undesirable damage of the surface of the wiper arm 10 because of an uncontrollable turning of the arm part 11 is avoided. Such damages can in particular occur when, without available abutment means 14, the arm part 11 is turned in direction of the turned down position so far that a free edge 25 of the U-shaped arm part 11 located in the hinge region and shown in FIGS. 8 and 9 comes in collision with an opposite outer surface of the mounting parts 12. Thereby varnish damages, or scratching or marking of the outer surface of the mounting part 12 and/or the arm part 11 are caused. Such damages are optically not pleasant and can lead to an undesirable corrosion of the corresponding components.

By providing an abutment means 14 in the hinge overlapping region, whereby the abutment means 14 preferably are formed inside of the hinge region of the wiper arm 10, such an uncontrolled turning of the arm part 11 relative to the abutment means 14 and the occurrence of damages on the passing points in particular on the mounting part 12 are avoided. Because of this reliable and precise positioning of the arm part 11 in its both stable end positions, mounting position and turned down position, it is possible to design a very small gap between the free edge 25 shown in FIGS. 8 and 9 and the outer surface of the mounting element 12 as especially small. In this manner a compact wiper arm 10 which has a harmonious U-transition in the hinge region is provided.

Furthermore, the elastic restoring force produced by the pulling spring 21 in the arm part 11 can be adjusted as to its magnitude, without taking into consideration of the damages of the wiper arm 10 on its outer surface, which are to be avoided. It is possible to adjust in particular the turned-down position, a high-stabilizing elastic restoring force which acts on this position. Thereby a high holding force of the arm part 11 during a wiper blade exchange is provided, and the wiper arm 10 is better secured relative to an uncontrolled return turning of the arm part 11 to the operational position. Thereby eventual damages of the vehicle window by an uncontrolled arm part 11 which is turned back from the turned down position are avoided. The turning down angle can be selected so that the wiper blade can be easily turned out under the wiper arm 10. The hinge kinematics of the wiper arm 10 allows reliable optimization with a corresponding adjustment of the spring force of the pulling spring 12 in order to obtain a high spring force.

In accordance with a not shown embodiment of the invention, the abutment means 14, instead of being covered, can be visible from outside. Furthermore, the hinge means 13, instead of both-side abutment means 14, can be provided at one side with a corresponding abutment means 14 (abutment element 16, abutments 15, 17). The abutment means 14 can be arranged on the side of the wiper arm 10 which is opposite to the vehicle inner space.

The mounting part 12 can be formed as a cast part or as a metal plate bending part, while the arm part 11 can be preferably formed as a metal plate bending part.

It will be understood that each of the elements described above, or two or more together, may also find a useful application in other types of constructions differing from the types described above.

While the invention has been illustrated and described as embodied in wiper arm for a vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A wiper arm for a vehicle, comprising an arm part; a mounting part; hinge means which hingedly connect said arm part with said mounting part; abutment means arranged so that a relative turning movement of said arm part and said mounting part via said hinge means is limited by said abutment means; said abutment means including two spaced abutments and an abutment element which is bringable in operative contact with said two abutments during the turning movement of a respective one of said parts, said abutments being formed of one piece with one of said parts and said abutment element being formed of one piece with another of said parts, wherein said abutment means is arranged inside a hinge cover region of said hinge means, and wherein said hinge means is formed so that said turning movement of a respective one of said parts is performed between a mounting position and a turned away position of said wiper arm, wherein the mounting position and the turned away position comprise a stable end position of the arm part; and spring means biasing said wiper arm part to keep said upper arm part in said stable end positions.

2. A wiper arm as defined in claim 1, wherein said hinge means is formed so that an equilibrium position of the wiper arm is located between said mounting position and said turned away position.

3. A wiper arm as defined in claim 2, wherein said hinge means is formed so that an operative position of the wiper arm is located between said mounting position and said equilibrium position.

4. A wiper arm as defined in claim 1, wherein said abutment element is formed on said arm part which in the hinge cover region is arranged outwardly of said mounting part.

5. A wiper arm as defined in claim 1, wherein said abutments are formed at one side of said hinge means.

6. A wiper arm as defined in claim 1, wherein said abutment means is formed at both sides of said hinge means.

7. A wiper arm as defined in claim 1, wherein said abutment element is formed as a projection which during an abutment is loaded with bending and extends in the hinge cover region into an interior of the wiper arm.

8. A wiper arm as defined in claim 1, wherein said abutment element is formed as a projection which during an abutment is loaded with sheering and extends in the hinge cover region into an interior of the wiper arm.

9. A wiper arm as defined in claim 1; and further comprising a curvilinear recess defined by said abutments and a portion of the mounting part.

10. A wiper arm as defined in claim 1; and further comprising a rectilinear recess defined by said abutments and a portion of the mounting part.

11. A wiper arm as defined in claim 1, wherein said abutment element has a flat abutment surface.

12. A wiper arm as defined in claim 1, wherein said abutment element has a curved abutment surface.

13. A wiper arm for a vehicle, comprising an arm part; a mounting part; hinge means which hingedly connect said arm part with said mounting part and have a turning axis; abutment means arranged so that a relative turning movement of said arm part and said mounting part via said hinge means is limited by said abutment means; said abutment means including two spaced abutments and an abutment element which is bringable in operative contact with said two abutments during the turning movement of a respective one of said parts, said abutments being formed of one piece with another of said parts; and pulling spring means acting between said arm part and said mounting part so that said pulling spring exerts a force bias to said arm part in an operative position and in a turned-away position of said wiper arm, so that in said turned away position an actuating line of said pulling spring means is positioned on one side of said turning axis while said abutment elements and said abutments are located on the other side.

* * * * *